Figure 1:
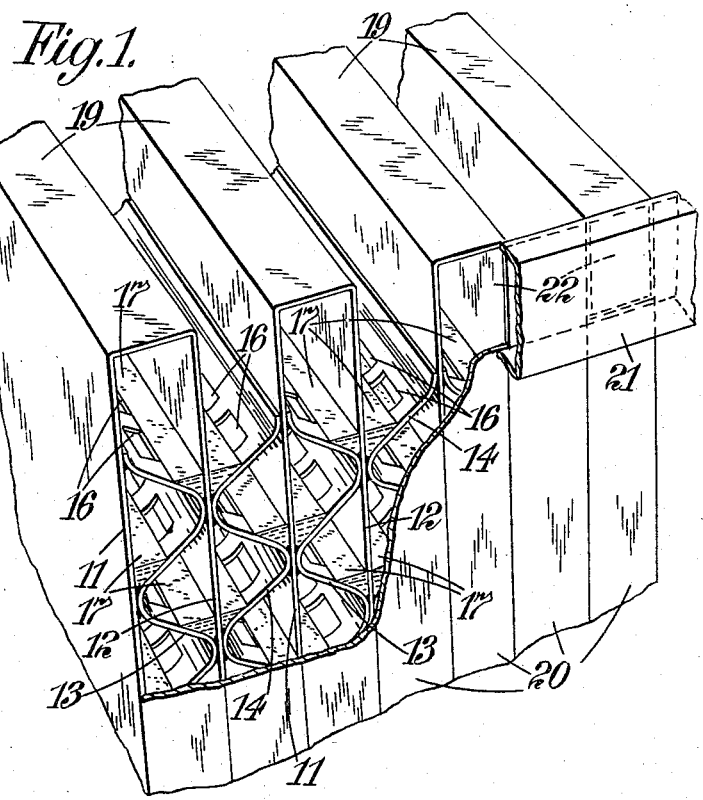

May 5, 1959　　　G. G. HASELDEN　　　2,885,195
FRACTIONATING APPARATUS
Filed Oct. 10, 1955　　　　　　　3 Sheets-Sheet 1

INVENTOR
GEOFFREY G. HASELDEN

By Watson, Cole, Grindle & Watson
ATTORNEYS

May 5, 1959  G. G. HASELDEN  2,885,195
FRACTIONATING APPARATUS
Filed Oct. 10, 1955  3 Sheets-Sheet 2
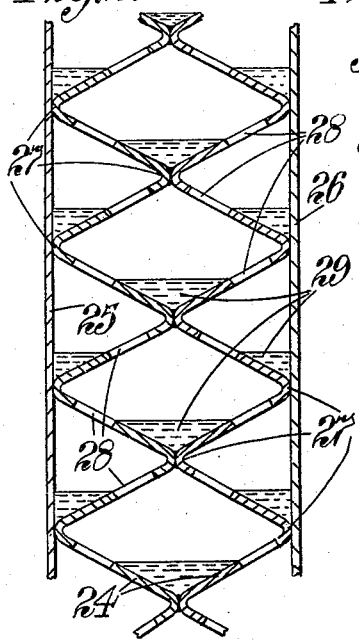
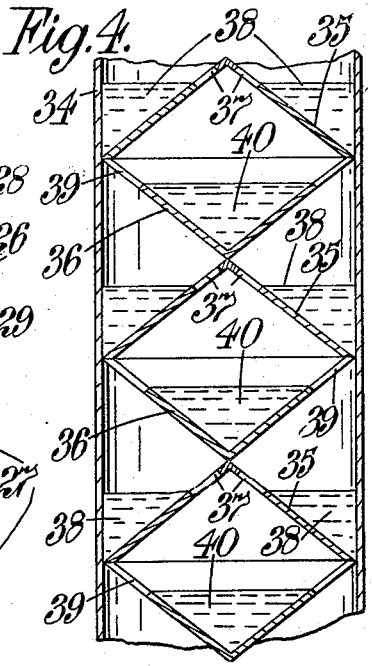
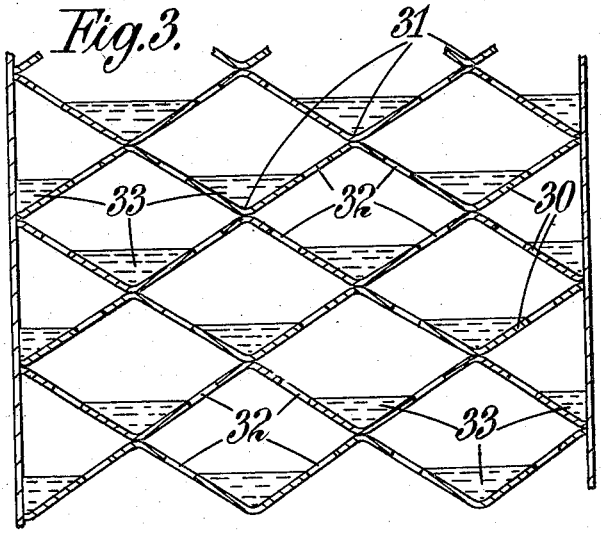
INVENTOR
GEOFFREY G. HASELDEN
By Watson, Cole, Grindle & Watson
ATTORNEYS United States Patent Office 2,885,195
Patented May 5, 1959

2,885,195

FRACTIONATING APPARATUS

Geoffrey Gordon Haselden, Morden, England

Application October 10, 1955, Serial No. 539,602

Claims priority, application Great Britain October 11, 1954

12 Claims. (Cl. 261—112)

This invention comprises improvements in or relating to fractionating apparatus. It is an object of the invention to provide a fractionating column of high separating performance. It is a further object of the invention to provide such a column in which transfer of heat to or from the materials being fractionated is possible during fractionation.

The fractionating column herein described is designed primarily for use in the treatment of mixed gases such as are met with in the manufacture of liquid air but the apparatus is capable of many other applications.

According to the present invention a fractionating column comprises walls, and a series of superposed partitions which individually extend both upwardly and across the column and which together follow a course up the column which zig-zags or otherwise deviates from side to side within the walls, which partitions have apertures in the upper portions of the sections or deviations of the zig-zag or deviating construction, so that gas may pass upwardly through the apertures and liquid may collect in, and overflow from, pockets or troughs formed by the lower portions of the sections or deviations, below the apertures.

In a preferred construction the column comprises two flat upright parallel walls with a zigzag partition element extending between them, which partition element is in the form of a generally upright sheet, for example of metal, having horizontal corrugations provided with appropriate perforations, the apices of the corrugations being united to the walls on either side. With this construction the perforations may take the form of a row of rectangular holes extending in a horizontal direction immediately below the apex of each bend in the corrugations, with the pockets or troughs bounded by the sloping part of each corrugation below the row of perforations thereof and above the next point beneath at which the corrugated sheet is attached to either wall of the column. In order that all or the greater part of the liquid shall overflow from the troughs through the rows of holes and not leak away at the ends of the troughs, the ends of the walls and the corrugated element should seal against end closure strips extending the full height of the column.

If the walls of the column are made of metal they afford good means of heat transfer to or from the substance under treatment therein, the walls of the partition elements also giving additional heat transfer surface.

It is possible to arrange several such units side by side, the intermediate walls being constituted by single thicknesses of metal, and in this case a cold mixture which requires fractionating and to receive heat in so doing, may be arranged to be treated alongside an adjacent column or columns which are not so cold and which require during treatment to part with heat. The two or more fractionating columns in this case co-operate with one another for the carrying out of a complex fractionating process. This is particularly valuable in the treatment of air for the separation of oxygen and nitrogen by liquefaction and fractionation as described for example in co-pending patent application Serial No. 468,110.

Figure 5:
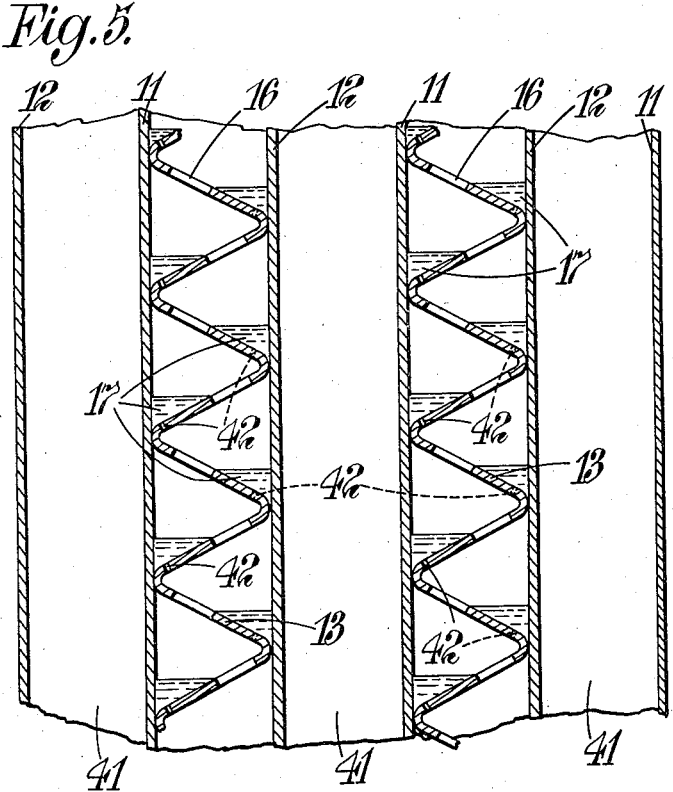

Various embodiments of the invention will now be described by way of example, and with reference to the accompanying drawings, in which:

Figure 1 is a perspective view, part broken away, of a multiple unit fractionating apparatus employing one construction of fractionating column, Figures 2, 3 and 4 show diagrammatically in cross sectional elevation three other constructions of fractionating column in accordance with the invention, and Figure 5 shows diagrammatically in cross sectional elevation another construction of multiple unit fractionating apparatus.

Referring firstly to Figure 1, this shows a form of fractionating apparatus suitable for use in connection with the treatment of air for the separation of oxygen and nitrogen by liquefaction and fractionation, as described for example in co-pending patent application Serial No. 468,110.

In this apparatus a series of parallel vertical metal walls 11, 12 are separated by horizontally corrugated metal spacer elements 13, 14, which spacer elements are united, for example by solder, to the walls where they touch them at the bends or apices of the corrugations. Each spacer element is provided with a horizontal row of rectangular holes 16 just beneath each level at which it has the apex of a corrugation united to either of the walls 11, 12 between which it lies. The effect is to form a horizontal pocket or trough 17 below each row of holes 16, in the angle between the spacer elements 13 or 14, and one or other of the walls 11, 12, as the case may be, where liquid can collect and whence overflowing, it can creep through the perforations and run as a thin film down the underside of the corrugation.

The tops of alternate spaces between the walls 11, 12 are closed over as shown at 19, and the ends of all the spaces are sealed by separate strips of sheet metal 20 (partly broken away). A manifold 21 is connected by ports 22 to the upper ends of the spaces which have their tops closed over and contain the spacer elements 13, to collect nitrogen therefrom. A similar manifold (not shown) at the bottom delivers air into said spaces.

The intermediate open-topped spaces, containing the spacer elements 14, are connected at the bottom to another manifold (not shown) for drawing off oxygen. Air in vapour form is led into the bottoms of the closed-topped spaces and fractional condensation occurs therein, a product consisting of about 50% oxygen being drawn off from the bottom and a product which is mainly nitrogen from the top. Meanwhile, fractional vaporisation occurs in the open-topped spaces, liquid feed consisting of about 75% oxygen entering, and vaporised nitrogen leaving, at the top while a liquid product of nearly pure oxygen is collected at the bottom. The heat given off during condensation in the close-topped spaces is transferred through the walls 11, 12 and absorbed by the evaporation occurring in the open-topped spaces.

By arranging a large number of alternate fractional condensation columns and fractional evaporation columns side by side in this way, a very large capacity is brought into a small space. Also, although a compound assembly of columns is thereby produced it is easily manufactured, the units consisting simply of alternate flat wall plates and zigzag perforated plates, with appropriate ends and top and bottom manifolds. If heat transfer is to take place between a liquid-vapour system undergoing fractionation and one or more other fluid streams which do not themselves require to be simultaneously fractionated the apparatus shown in Figure 5 may be employed, the spaces or channels 41 conveying the fluid streams which do not require to be fractionated being provided with other arrangements of partitions or packings of kinds already known for heat transfer duty only.

Other methods of construction of the fractionating device, which embody the same general principles of liquid and vapour distribution, are possible in cases in which the transfer of heat is not required as a primary accompaniment to fractionation. In one such construction illustrated in Figure 2, two (or more) generally vertical spacer elements 24 with horizontal corrugations can be disposed between opposed vertical wall plates 25, 26, each element 24 having its corrugation apices 27 united either to one of the walls 25, 26 or to the apices of the next element 24 alongside it. As before, rows of perforations 28 are provided just below each apex bend in each element 24, and liquid pockets or troughs 29 are formed beneath these rows.

In another construction, shown in Figure 3 the corrugated elements 30 are laid horizontally across the fractionating column, one upon another, with the apices 31 of the corrugations of each element meeting those of the elements above and below it to form a kind of honeycomb structure. Perforations 32 are again provided along each inclined face of each corrugated element 30 at a level just below the apices 31 of the corrugations. The down-flowing liquid will therefore collect in the troughs 33 formed by tthe lower apices of the elements 30 and will overflow through the perforations to form a thin liquid film on the underside of each element 30.

This construction could be modified by arranging the corrugated sheets in such manner that the corrugations in each succeeding sheet extend at an angle, for example at right angles, to those in the preceding sheet, the apices of the corrugations of adjacent sheets being united where they cross. In both cases, the ends of the column could be sealed by having a series of horizontal closure strips bonded on instead of the vertical strips of the previously described embodiments.

In yet another construction, shown in Figure 4, the walls of the column take the form of a circular tube 34 and in this case the zigzag partitions are constituted by hollow cones 35, 36 the bases of which fit the interior of the column tube and which are stacked within the column alternately base to base and apex to apex. In this case the cones 35 which lie apex-upward have perforations 37 near their apices and provide liquid pockets or troughs 38 between the base of each cone and the outer wall, while the inverted cones 36 have perforations 39 in a circumferential row near their base edges and form central liquid pockets 40 in their interiors below said perforations. The bases of the cones are united to the tube wall of the column to seal the liquid troughs 38 and to promote heat transfer to the cones.

Other possibilities arise within the scope of the invention. Thus the partitions within the column might be constituted by horizontal lengths of tubing, for example superposed tube lengths staggered alternately from side to side of the column in the direction normal to their axes.

With all these constructions the path of gases upward through the fractionating column is determined by the locations of the perforations which are alternately at one side of a zigzag and then the other. This gives a tortuous course to the gases and causes them to impinge repeatedly on the underside of the material of the zigzag below the pockets. Liquid collecting in the pockets overflows through the perforations in the form of thin films which spread themselves on the undersides of the pockets and consequently are exposed to impingement by the rising gases. This promotes intimate contact between vapour and liquid and so facilities effective fractionation. Also the liquid troughs serve to redistribute the downflowing liquid across the column and thereby act to prevent unequal distribution of flow across the column.

Furthermore, at each stage there is a horizontal row of holes which afford in effect the upper lip to each pocket and there is a space above the liquid in the pocket, into which the holes open, which forms a relatively wide channel for intermixing of vapour and pressure equalisation. The successive passage of gases through the holes and into these spaces tends to promote turbulent flow conditions, which again favours effective interchange of constituents between gas and liquid.

Columns constructed according to the foregoing may be employed as reflux condensers or partial evaporators, and it will be understood that the term "fractionating column" as employed in the following claims is intended to include any apparatus in which some fractionation occurs and where a construction in accordance with the invention would be appropriate.

If desired, the bottoms of the pockets or troughs may be provided with fine holes 42 (see Figure 5), in addition to the apertures at the tops of the troughs, to allow the column or apparatus to be drained.

I claim:

1. A fractionating column comprising walls, and a series of superposed partitions within said walls and made of fluid-impervious material each of which partitions extends both upwardly and across the column and has its upper and lower margins connected to the walls on opposite sides of the column so as to provide seals which prevent fluid flow past its upper and lower ends, each succeeding partition being sloped in a different direction to the partition preceding it, and wherein each partition has at least one fluid flow aperture through its upper portion to permit the upward flow of gas through the column, and the part of the partition below said aperture constitutes the wall of a liquid-collecting trough from which liquid can flow over the top edge of said trough wall through the lower portion of said aperture and run down the underface of the partition as a film, whereon the gas issuing upwards through the aperture in the partition below impinges.

2. A fractionating apparatus comprising a plurality of columns according to claim 1, disposed side-by-side, with a common wall between each succeeding column and the one preceding it whereby heat transfer between adjacent columns can take place through the common walls.

3. A fractionating column as claimed in claim 1, wherein the walls comprise flat upright walls, and the series of superposed partitions are constituted by a plurality of superposed zig-zag partition elements extending between said walls, each of said partition elements being in the form of a generally horizontal corrugated sheet provided with perforations to constitute the fluid flow apertures, the lower apices of the corrugations of each succeeding sheet resting on the upper apices of the corrugations.

4. A fractionating column as claimed in claim 3, wherein the perforations take the form of rows of holes extending in a horizontal direction immediately below each upper apex of each corrugated sheet on both sides of said apex, with the troughs formed by the parts of the corrugations below the rows of perforations.

5. A fractionating column as claimed in claim 1, wherein the bottoms of the troughs are provided with fine drain holes to allow the column to be drained.

6. A fractionating column comprising two flat upright parallel walls, and a series of superimposed partitions within said walls and made of fluid-impervious material, each of which partitions extends both upwardly and across the column and has its upper and lower margins connected to the walls on opposite sides of the column so as to provide seals which prevent fluid flow past its upper and lower ends, each succeeding partition being sloped in a different direction to the partition preceding it, and wherein each partition has at least one fluid flow aperture through its upper portion to permit the upward flow of gas through the column, and the part of the partition below said aperture constitutes the wall of a liquid-collecting trough from which liquid can flow over the top edge of said trough wall through the lower portion of said aperture and run down the underface of the partition as a film, whereon the gas issuing upwards through the aperture in the partition below impinges, the said series of superposed partitions being constituted by a zig-zag partition element extending between said parallel walls, the said partition element being in the form of a generally upright sheet having longitudinally horizontal corrugations provided with perforations to constitute the said fluid flow apertures, and the apices of the corrugations being united to the walls on either side.

7. A fractionating column as claimed in claim 6, wherein the perforations take the form of a row of rectangular holes extending in a horizontal direction immediately below the apex of each bend in the corrugations, with the pockets or troughs bounded by the sloping part of each corrugation below the row of perforations thereof and above the next point beneath at which the corrugated sheet is attached to either wall of the column.

8. A fractionating column as claimed in claim 6, wherein the ends of the flat walls and the partition element are sealed on to closure strips extending the full height of the column to close in the ends thereof.

9. A fractionating column comprising upstanding walls, and a series of superposed partitions within said walls and made of fluid-impervious material each of which partitions extends both upwardly and across the column and has its upper and lower margins sealed to the walls on opposite sides of the column in fluid-tight manner to prevent fluid flow past its upper and lower ends, each succeeding partition being sloped in the reverse direction to the partition preceding it so that the partitions together follow a course up the column which deviates from side to side within the walls, and wherein each partition has fluid flow apertures through its upper portion to permit the sinuous upward flow of gas through the column, and the part of the partition below said apertures constitute the walls of a liquid-collecting trough from which liquid can flow over the top edge of said trough wall through the lower portions of said apertures and run down the underface of the partition as a film whereon the gas issuing upwards through the apertures in the partition below impinges.

10. A fractionating column comprising two flat upright parallel walls, and at least one series of superposed partitions within said walls and made of fluid-impervious material, each of which partitions extends both upwardly and at least partly across the column, and each succeeding partition being sloped in a different direction to the partition preceding it, and wherein each partition has at least one fluid flow aperture through its upper portion to permit the upward flow of gas through the column, at least alternate partitions in the series having their upper margins, above their said fluid flow apertures, connected to a wall of the column so as to provide seals, and the part of each partition below its fluid flow aperture constituting the wall of a liquid-collecting trough from which liquid can flow over the top edge of said trough wall through the lower portion of said aperture and run down the underface of the partition as a film, whereon the gas issuing upwards through the aperture in the partition below impinges, the said series of superposed partitions being constituted by at least two zig-zag partition elements disposed side by side between the said parallel walls, each of the said partition elements being in the form of a generally upright sheet having longitudinally horizontal corrugations provided with perforations to constitute the said fluid flow apertures, and the partition elements being united to each other and to the walls at the apices of the corrugations.

11. A fractionating column comprising walls, and at least one series of superposed partitions within said walls and made of fluid-imprevious material, each of which partitions extends both upwardly and at least partly across the column, and each succeeding partition being sloped in a different direction to the partition preceding it, and wherein each partition has at least one fluid flow aperture through its upper portion to permit the upward flow of gas through the column, at least alternate partitions in the series having their upper margins, above their said fluid flow apertures, connected to a wall of the column so as to provide seals, and the part of each partition below its fluid flow aperture consituting the wall of a liquid-collecting trough from which liquid can flow over the top edge of said trough wall through the lower portion of said aperture and run down the underface of the partition as a film whereon the gas issuing upwards through the aperture in the partition below impinges, the walls being constituted by an upright tube of circular section, the said series of superposed partitions comprising a succession of superposed hollow cones provided with perforations to constitute the said fluid flow apertures and having base diameters to fit the interior of the tube, alternate cones up the length of the tube being disposed apex-upward and the intermediate cones base-upward, each of said apex-upward alternate cones meeting the cone below base-to-base and the cone above it apex-to-apex.

12. A fractionating column as claimed in claim 11, wherein the perforations take the form of a horizontal row of holes around each cone, just below the apex of each apex-upward cone and just below the base edge of each base-upward cone.

References Cited in the file of this patent

UNITED STATES PATENTS

| | | |
|---|---|---|
| 537,509 | Wardle et al. | Apr. 16, 1895 |
| 1,169,764 | Brassert | Feb. 1, 1916 |
| 1,790,489 | Sippel et al. | Jan. 27, 1931 |
| 2,681,269 | Bergstrom | June 15, 1954 |

FOREIGN PATENTS

| | | |
|---|---|---|
| 1,171 | Austria | Apr. 10, 1900 |
| 899,196 | France | July 31, 1944 |
| 988,034 | France | Apr. 25, 1951 |
| 678,100 | Germany | July 8, 1939 |
| 684,870 | Germany | Dec. 7, 1939 |
| 846,092 | Germany | Aug. 7, 1952 |